United States Patent [19]

Liu et al.

[11] Patent Number: 5,802,567

[45] Date of Patent: Sep. 1, 1998

[54] MECHANISM FOR MANAGING OFFSET AND ALIASING CONDITIONS WITHIN A CONTENT-ADDRESSABLE MEMORY-BASED CACHE MEMORY

[75] Inventors: Peichun Peter Liu; Rajinder Paul Singh; Shih-Hsiung Steve Tung, all of Austin, Tex.

[73] Assignee: International Business Machines Corporation, Armonk, N.Y.

[21] Appl. No.: 742,233

[22] Filed: Oct. 31, 1996

[51] Int. Cl.⁶ ................................................ G06F 12/00
[52] U.S. Cl. .................... 711/133; 711/146; 711/136; 711/131; 711/108; 364/131
[58] Field of Search .......................... 711/146, 136, 711/108, 133; 364/131

[56] References Cited

U.S. PATENT DOCUMENTS

| | | | |
|---|---|---|---|
| 4,594,651 | 6/1986 | Jaswa et al. | 364/131 |
| 5,602,764 | 2/1997 | Eskandari-Gharnin et al. | 711/108 |
| 5,640,534 | 6/1997 | Liu et al. | 711/146 |

Primary Examiner—Tod R. Swann
Assistant Examiner—Mehdi Namazi
Attorney, Agent, or Firm—Anthony V. S. England; Antony P. Ng; Andrew J. Dillon

[57] ABSTRACT

A cache memory having a mechanism for managing offset and aliasing conditions is disclosed. In accordance with a preferred embodiment of the invention, the cache memory comprises a first directory circuit, a second directory circuit, a multiple number of most recently used bits, and a multiple number of set/reset circuits. The first directory circuit, having multiple caches lines, is utilized to receive partial effective addresses. The second directory circuit is utilized to receive an output from the first directory circuit. A most recently used bit is associated with each cache line within the first directory circuit. The set/reset circuit, coupled to each of the most recently used bits, is utilized to set one of the most recently used bits to a first state while concurrently resetting the rest of the most recently used bits to a second state within a single cycle during an occurrence of an offset or aliasing conditions such that offset or aliasing conditions can be more efficiently managed.

10 Claims, 5 Drawing Sheets

MECHANISM FOR MANAGING OFFSET AND ALIASING CONDITIONS WITHIN A CONTENT-ADDRESSABLE MEMORY-BASED CACHE MEMORY

CROSS-REFERENCE TO A RELATED APPLICATION

The present invention is related to the subject matter of a co-pending U.S. Pat. application Ser. No. 08/319,201, filed Oct. 5, 1994, and assigned to the assignee herein named. The content of the above-mentioned co-pending United States Patent Application is incorporated herein by reference.

BACKGROUND OF THE INVENTION

1. Technical Field

The present invention relates to a cache memory for data storage in general and, in particular, to a content-addressable memory-based cache memory for storing data within a computer system. Still more particularly, the present invention relates to a mechanism for managing offset and aliasing conditions within a content-addressable memory-based cache memory.

2. Description of the Prior Art

Many high-performance data processing systems include both a system memory and a cache memory. A cache memory is a relatively high-speed memory that stores a copy of information that is also stored in one or more portions of the system memory. The cache memory can be integrated within a processor device (on-chip) of the data processing system or remain separate from the processor device of the data processing system.

Content-Addressable Memories (CAMs) are commonly utilized in a processor device, which has an on-chip cache memory, for functions such as directory look-up. A CAM examines an input address to the on-chip cache memory by comparing the input address with all internally stored addresses. If any one of the internally stored addresses matches the input address, then the CAM signals that there is a match (or a "hit" in cache memory terminology).

A semi-associative cache utilizes CAMs to narrow down the identity of the desired cache line to a single cache line before the real address is known. Typically, there are two CAMs within a semi-associative cache, namely, an ECAM and a RCAM. The ECAM stores a subset of the effective address of the cache line in an ECAM tag, while the RCAM stores the real address of the cache line in a RCAM tag. When the processor device needs a particular cache line, the processor device binarily indexes into a certain number of cache lines with a first subset of the effective address and matches the real address against the contents of the RCAMs within the certain number of cache lines referred to as a "camlet." The number of entries in the camlet determines the way of associativity of the cache memory. An ECAM "hit" indicates that the requested data may be in the cache line associated with the matching ECAM. The effective address must then be translated into a real address for comparing to the RCAM tag of the matching ECAM cache line in order to determine whether or not it is a full cache "hit."

Semi-associative caches suffer a problem known as "offset." Offset occurs when two or more entries in a camlet having an identical ECAM tag. This problem typically occurs after a cache request resulting in an ECAM "hit" and a RCAM "miss." When this occurs, the cache memory must fetch data from the main memory that will have, by definition, the same ECAM tag as the first-matching cache line. If the cache memory places this data directly into another cache line of the same camlet, then an offset condition will occur. Incidentally, the next request for this new data or for the data associated with the first-matching cache line will cause two ECAM tags to match and output their cache lines to the RCAMs. Thus, the cache memory will not operate properly if a cache offset occurs.

One solution to cache offset problems requires that a cache line be immediately invalidated after it generated the combination of an ECAM "hit" and a RCAM "miss." This solution does preclude two entries within the same camlet from ever having the same ECAM tag. However, the invalidated cache line may be useful to the processor device in the near future. Further, the cache memory will be busy for one clock cycle during the invalidation step, which might otherwise be useful for other accesses to the cache memory.

A better solution is to utilize a Most Recently Used (MRU) bit for each ECAM tag in the cache memory. When a cache lookup is performed, the matching effective address is selected as an ECAM "hit" only if its MRU bit is turned on. The real address is then compared to confirm that the selected entry is correct. If it is not, and if there is a real address hit, the effective address bit is written to another entry, and the MRU bit for all other ECAM tags within the congruence class that match the effective address are then turned off. One problem with this solution is that the effective address port will be occupied for two clock cycles in order to set and reset the MRU bits, during which the effective address port is unavailable for any other cache access. Consequently, it would be desirable to provide a mechanism to resolve the offset (and aliasing) conflicts in a more efficient manner.

SUMMARY OF THE INVENTION

In view of the foregoing, it is therefore an object of the present invention to provide an improved cache memory for data processing.

It is another object of the present invention to provide an improved content-addressable memory-based cache memory for storing data within a computer system.

It is yet another object of the present invention to provide an improved mechanism for managing offset and aliasing conditions within a content-addressable memory-based cache memory.

In accordance with a preferred embodiment of the invention, the cache memory comprises a first directory circuit, a second directory circuit, a multiple number of most recently used bits, and a multiple number of set/reset circuits. The first directory circuit, having multiple caches lines, is utilized to receive partial effective addresses. The second directory circuit is utilized to receive an output from the first directory circuit. A most recently used bit is associated with each cache line within the first directory circuit. The set/reset circuit, coupled to each of the most recently used bits, is utilized to set one of the most recently used bits to a first state while concurrently resetting the rest of the most recently used bits to a second state within a single cycle during an occurrence of an offset or aliasing conditions such that offset or aliasing conditions can be more efficiently managed.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in any data processing system having a content-addressable, memory-based cache memory. Also, it is understood that the features of the present invention may be applicable in various data processing systems having a primary cache and a secondary cache.

Figure 1:
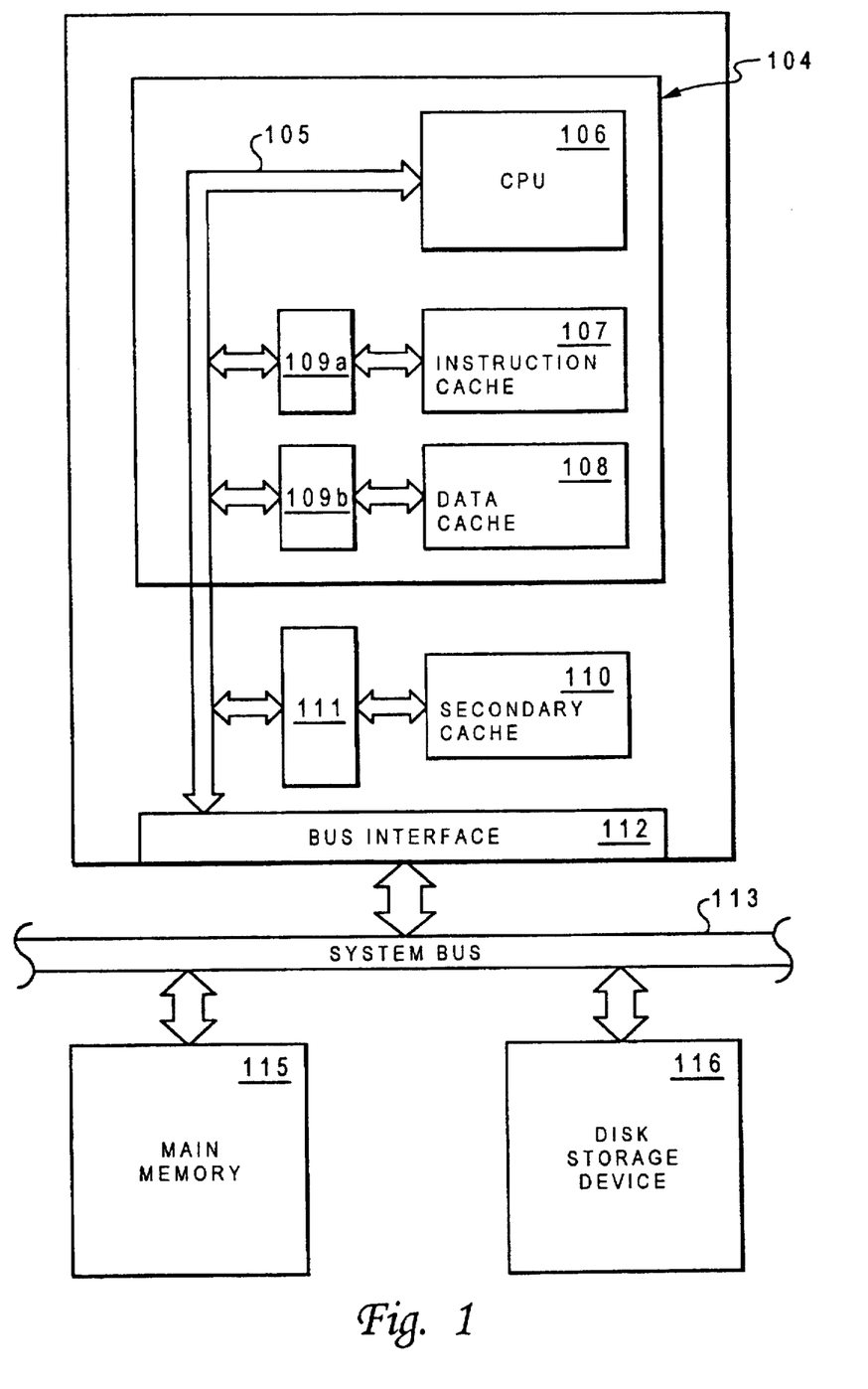
FIG. 1 is a block diagram of a typical data processing system having a multi-level cache memory hierarchy in which the present invention may be incorporated.

Referring now to the drawings and in particular to FIG. 1, there is illustrated a block diagram of a typical data processing system having a multi-level cache memory hierarchy in which the present invention may be incorporated. In FIG. 1, only a single processor 104 is shown; however, the features of the present invention are also useful in a multi-processor system. Processor 104, having a CPU 106 which may be of a superscalar RISC type, is constructed as a monolithic device comprising on-chip instruction cache 107 and on-chip data cache 108. Both caches 107, 108 are primary caches and are connected to CPU 106 by separate paths within a local bus structure. Instruction cache 107 is connected to local bus 105 via cache controller 109a, while data cache 108 is connected to local bus 105 via cache controller 109b.

A secondary cache 110 is also connected to local bus 105 via cache controller 111. Secondary cache 110 is usually much larger than either instruction cache 107 or data cache 108, and that access to secondary cache 110 is also somewhat slower than to either instruction cache 107 or data cache 108. CPU 106 is also connected to system bus 113 via bus interface 112 in which timing and control translations between local bus 105 and system bus 113 are taking place. In addition, a main memory 115 and a disk storage device 116 are coupled to system bus 113.

Instruction cache 107 and data cache 108 may be addressed by effective (i.e., untranslated) addresses as well as by real (i.e., physical) addresses. Thus, local bus 105 within processor 104 has a number of address buses, including effective address buses, real address buses, and instruction address buses. In contrast, secondary cache 110 is typically addressed by real addresses only.

As shown, the memory hierarchy is from the fastest to the slowest, from the smallest to the largest, and from the most expensive per bit to the least expensive per bit, in progression from primary caches 107, 108 to secondary cache 110, to main memory 115, and to disk storage device 116. Typically, main memory 115 contains a subset of what is in disk storage device 116, and secondary cache 110 contains a subset of what is in main memory 115. Depending on the relationship between primary caches 107, 108 and secondary cache 110, each of primary caches 107, 108 may contain information independent of what is in secondary cache 110.

CPU 106 can access primary caches 107, 108 within a processor cycle, while it may take several processor cycles to access secondary cache 110. If a cache "miss" occurs in primary caches 107, 108, and secondary cache 110, then main memory 115 is accessed to perform a cache linefill operation—replacing a cache line with an equivalent bit portion from main memory 115 which contains the addressed data. This cache linefill operation must be performed in order to satisfy the attempted cache access for which a cache "miss" occurred. If main memory 115 does not contain the location for which the cache linefill operation is attempted, then a page containing this data is obtained from disk storage device 116 such that the cache linefill operation can be completed.

Figure 2:
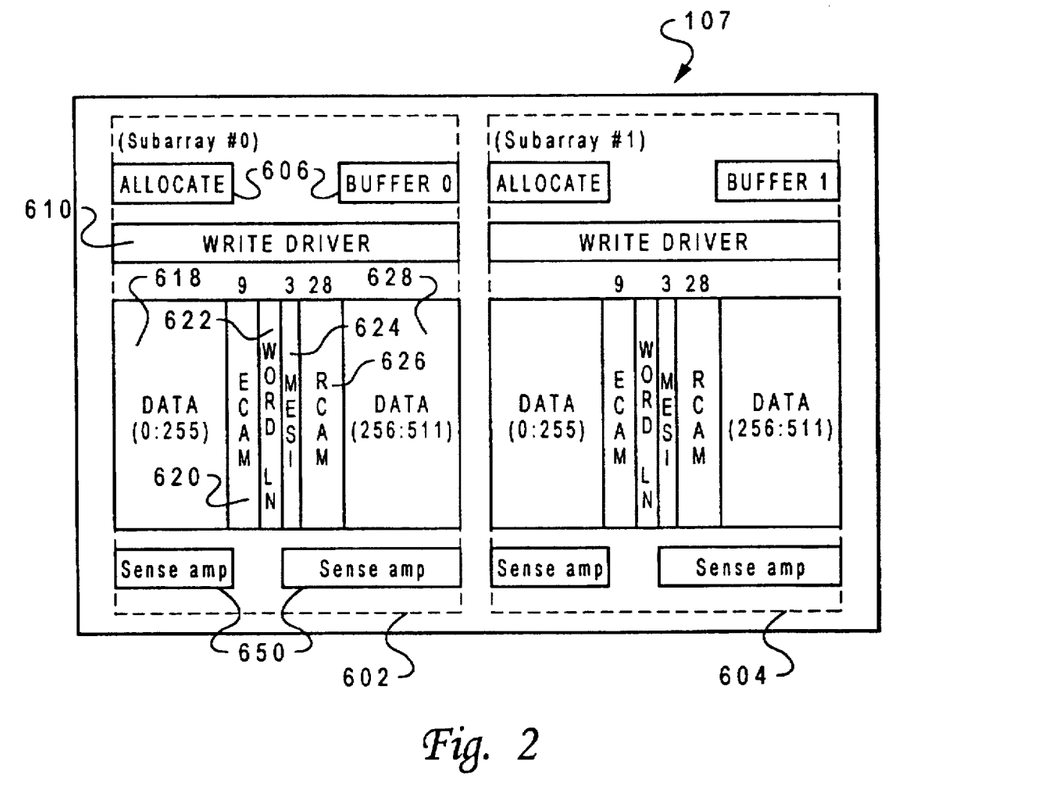
FIG. 2 is a block diagram of a primary cache as shown in FIG. 1.

With reference now to FIG. 2, there is illustrated a block diagram of a primary cache 107 (or 108) of FIG. 1. Primary cache 107 preferably includes two subarrays 602 and 604; however, as those skilled in the art will appreciate upon reference to the present specification, a larger number of subarrays may be provided. Because subarrays 602 and 604 are essentially identical, only subarray 602 will be further described in detail. Subarray 602 preferably includes 256 cache lines, wherein each cache line includes a 512 bit data field, which is broken into two segments, as depicted at 618 and 628 within subarray 602. Each cache line also preferably includes a 64-bit parity field (not shown), a 9-bit ECAM field 620, a 28-bit RCAM field 626, and a 3-bit MESI field 624.

As those skilled in the art will appreciate the so-called "MESI" is an acronym which stands for "Modified," "Exclusive," "Shared," and "Invalid." The status of any cache line may be efficiently determined by interrogating the status of the bits within MESI field 624. Also, the status of any cache line may be altered by writing different bits into MESI field 624.

Additionally, subarray 602 includes an associated allocate buffer 606 and an associated write driver 610 which are utilized to drive data into a particular cache line. Similarly, sense amplifier 650 is provided for amplifying an output signal from a particular cache line. By providing two separate and distinct content-addressable fields—ECAM field 620 and RCAM field 626—within each cache line, data within that cache line may be accessed in a number of efficient sequences.

Figure 3:
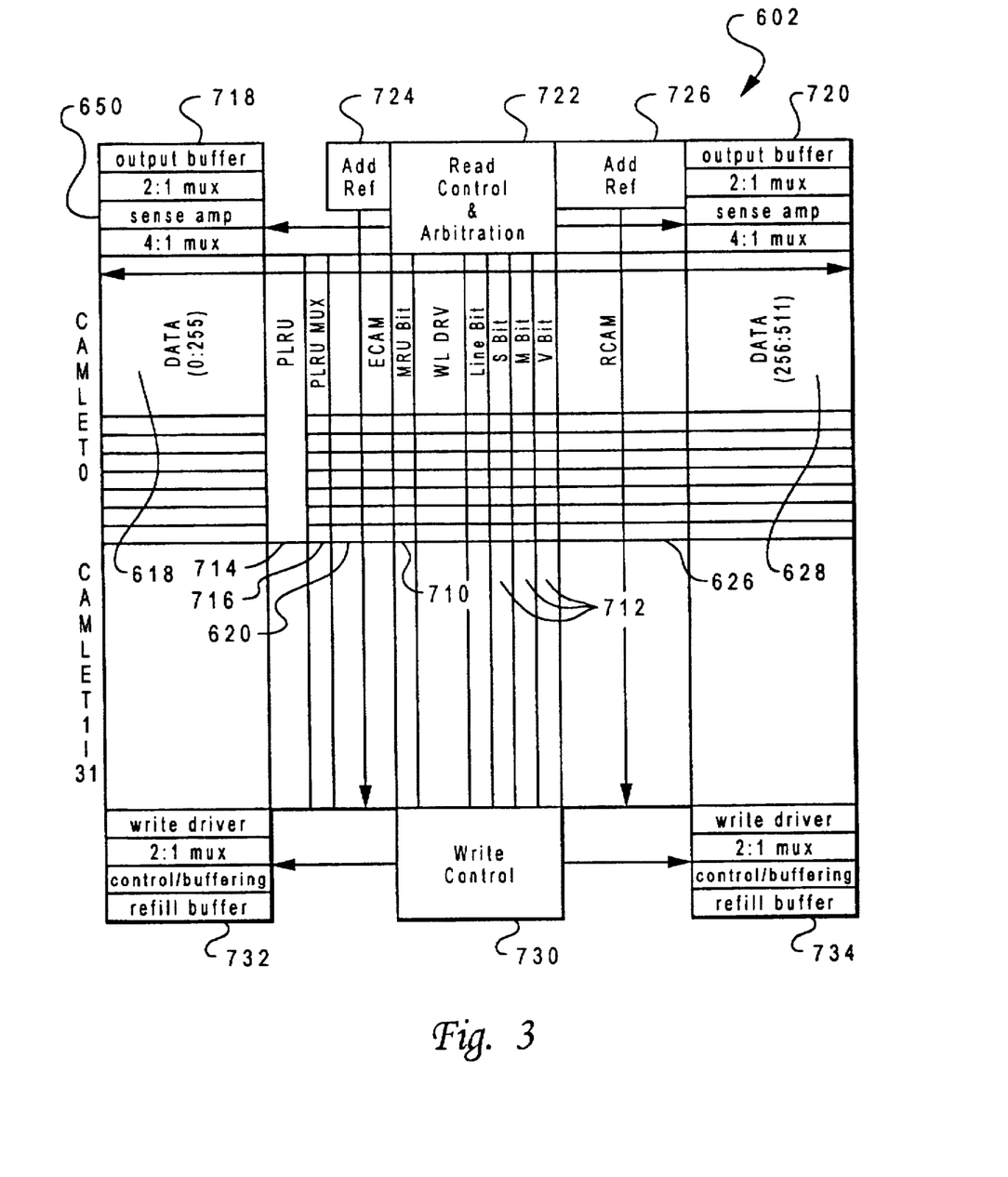
FIG. 3 is a detailed illustration of a subarray from FIG. 2.

Referring now to FIG. 3, there is depicted a detailed illustration of subarray 602 from FIG. 2. As shown, each cache line within subarray 602 includes 512 bits of data which is divided into data fields 618 and 628. RCAM field 626 is a twenty-eight-bit real-address, content-addressable field and ECAM field 620 is an eight-bit effective address content-addressable field. In addition, a most recently utilized (MRU) bit field 710 is utilized in conjunction with ECAM field 620 to resolve offset situations.

The bits within MESI field 624 are illustrated in greater detail at reference numeral 712. A pseudo least recently utilized (PLRU) logic circuit is present within subarray 602 and is depicted at block 714. Each camlet, which comprises eight cache lines, includes a separate PLRU logic circuit which may be utilized to allocate a particular line within that camlet for removal and replacement in the event of a cache miss and the requirement to load a new line of data.

A PLRU multiplexer 716 is utilized to permit a particular line within a camlet to be allocated in response to a lack of validity of the data therein or in response to a utilization data which is determined utilizing PLRU logic circuit 714. Output buffers 718 and sense amplifiers 650 are utilized in a conventional manner to read data from a cache line. Finally, write control 730 is utilized in conjunction with write drivers and the associated multiplexers, as indicated at 732 and 734, to permit data within the cache array to be written.

Figure 4:
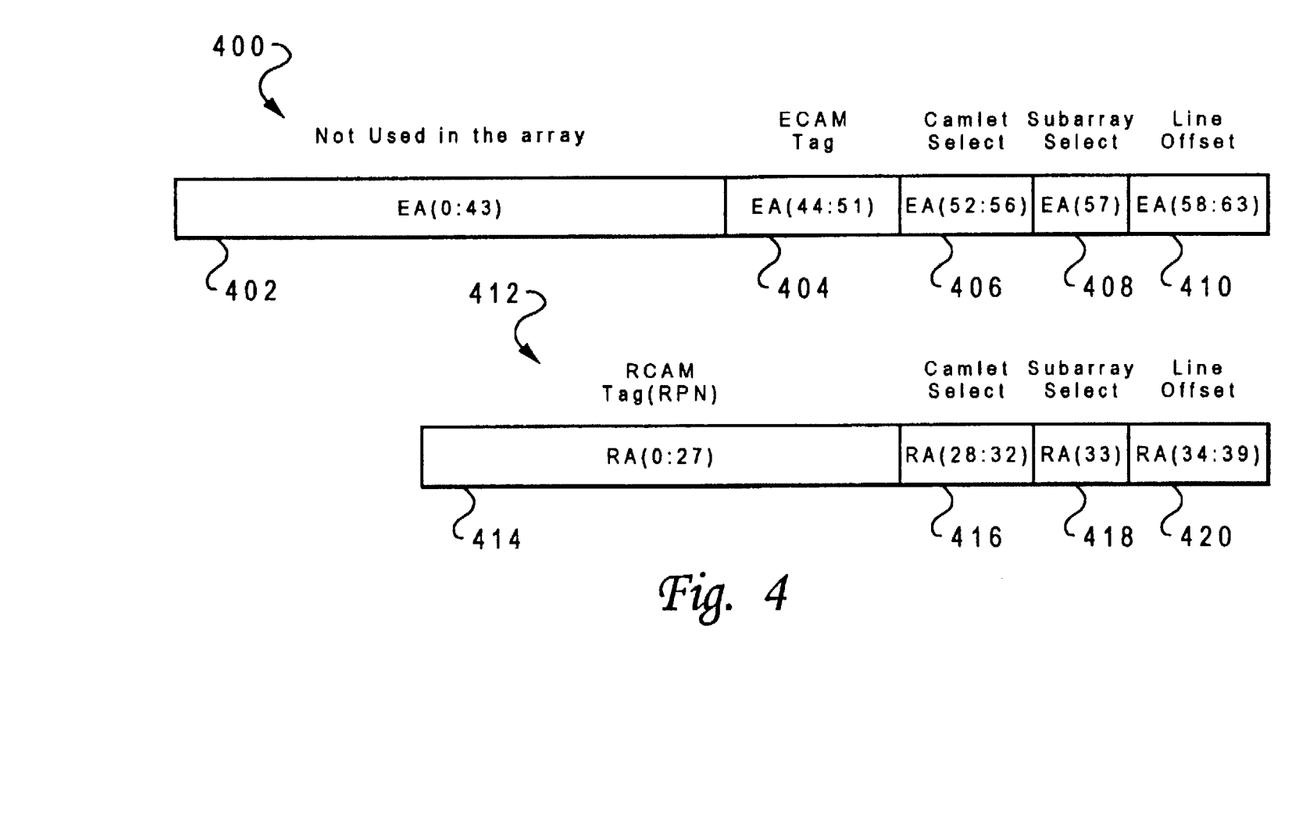
FIG. 4 is a graphical illustration of an indexing scheme which may be utilized within the primary cache of FIG. 2.

With reference now to FIG. 4, there is depicted a graphical illustration of an indexing scheme which may be utilized within the primary cache of FIG. 2. As illustrated, effective address 400 preferably includes 64 bits; however, bits 0 through bit 43, as depicted at 402, are not utilized for the purpose of cache indexing. Bits 58 through 63, as illustrated at 410, represent the line offset of effective address 400. Bit 57, as depicted at 408, is utilized to select one of the two subarrays within the primary cache of FIG. 2. Next, bits 52 through 56, as depicted at 406, are utilized to select one of 32 camlets within each of the two subarrays. As mentioned previously each camlet preferably comprises eight cache lines. Finally, bits 44–51, as depicted at 404, form an ECAM tag for ECAM field 620.

Real address 412 preferably includes 40 bits. As above, bits 34–39, as illustrated at 420, are the line offset for real address 412. Bit 33, as depicted at block 418, is utilized to select one of the two subarrays within the primary cache of FIG. 2. Bits 28–32, as illustrated at 416, are utilized to select one of the 32 camlets within one of the above two subarrays. Finally, bits 0–28, as depicted at 414, form a RCAM tag for RCAM field 626.

Those skilled in the art will appreciate that in accordance with the indexing scheme depicted in FIG. 4, each block of information within a data processing system that incorporates the primary cache of FIG. 2 includes two separate and distinct content-addressable fields which may be utilized in conjunction with a portion of the effective address (i.e., a partial effective address) and the real address to select a cache line within the primary cache. Because only a portion of the effective addresses is utilized to attempt a match within the ECAM field on an initial cache look-up, it is possible to encounter a situation in which the partial effective address indicates a "hit," but the data associated with that ECAM field is not the appropriate data. As mentioned previously, this situation is known as an "offset."

In addition, it is possible that although the portion of the effective address contained within the ECAM fields do not match the desired effective address upon initial look-up, the desired data may still be present within the cache. This is due to the fact that two different effective addresses may be mapped to an identical real address of the RCAM field. This situation is known as "aliasing."

In this situation, during a first cycle when the partial effective address is being utilized to determine if an ECAM tag within the desired camlet is a match, the desired effective address is being translated concurrently within the system into a real address by the memory management unit. Then, in a second cycle, the real address is utilized to attempt to locate a match within the RCAM tag that contains the real address. A "hit" in the RCAM at this point indicates an aliasing situation.

Finally, an aliased hit may occur in an offset situation. In this scenario, the portion of the effective address utilized to access the ECAM tags within a camlet indicates a "hit," but the real address portion stored therein does not match the real page number output from the memory management unit after translation. Again, at this point, it is known that the data of interest is not stored within this particular line; however, whether or not the desired data resides within any other camlet location having a different ECAM tag is not yet ascertained. In the second cycle, as described above with respect to the aliasing situation, the RCAM tags are examined for a match with the desired real address and a "hit" may occur, indicating that the requested data is present within the camlet but that the data has been allocated to a different effective address.

Offset and aliasing situations due to various scenarios of "hit" or "miss" in ECAM field, RTAG, or RCAM field are summarized in Table I. These offset and aliasing situations may be efficiently handled within the cache memory if the cache memory is constrained such that no two ECAM fields contain the same partial effective address within a camlet. This will ensure that only one cache line per camlet can match for a given effective address. As mentioned previously, an MRU bit may be stored as part of the ECAM field and utilized to permit two different ECAM fields to have the same stored address but only one ECAM field to match. In other words, if there are multiple copies of the same partial effective address stored within a camlet, only the particular ECAM field having a valid MRU bit will be considered as a true "hit."

TABLE I

| CASES | ECAM | RTAG | RCAM | RESULT |
|---|---|---|---|---|
| 1 | MISS | — | MISS | TRUE MISS |
| 2 | MISS | — | HIT | ALIAS |
| 3 | HIT | MISS | MISS | TRUE MISS |
| 4 | HIT | MISS | HIT | OFFSET |
| 5 | HIT | HIT | — | TRUE HIT |

Under prior art, the MRU bit was manipulated by an associated effective address access. If the MRU bit(s) need to be changed, one cycle was utilized to set MRU bit to a "0" for all copies of the ECAM tag in the camlet, then another cycle is needed to write the MRU bit of the current line to a "1." Because the effective address is required to select the tag entries in the ECAM, the effective address port is not available for other cache operations for at least two logical cycles.

The present invention provides a novel approach for resetting the non-current MRU bit and setting the current MRU bit within one clock cycle. Several results of the present invention are illustrated in the following pipeline tables by contrasting with the method under prior art.

The first example is Case 4 of Table I. There is a "hit" in the ECAM, but it is the wrong cache line. Cycle 3 is utilized to reset the MRU bit of the wrong cache line to a "0." Then, the ECAM tag is updated in cycle 4 and the MRU bit of the current ECAM tag is set to "1." This ties up the effective address port to the ECAM for both cycle 3 and cycle 4.

| Aliased Hit with Offset (Case 4 of Table I)-PRIOR ART | | | | |
|---|---|---|---|---|
| CYCLE | 1 | 2 | 3 | 4 |
| LINE # | (1) | (2) | (1) | (2) |
| MRU bit | = 1 | — | = 0 | = 1 |
| ECAM + MRU | HIT | — | HIT | write |
| RTAG | MISS | — | — | — |
| RCAM | — | HIT | — | HIT |
| MESI BITS | read | — | — | — |

Cycle
1 ECAM read
2 RCAM read without ECAM update
3 ECAM MRU reset cycle
4 RCAM read with ECAM update The next pipeline table shows the operation of the same Case 4 of Table I under the present invention. In this case, only one cycle is needed to reset the MRU bit of the wrong cache line and set the MRU bit of the current cache line.

| Aliased Hit with Offset-INVENTION | | | |
|---|---|---|---|
| CYCLE | 1 | 2 | 3 |
| LINE # | (1) | (2) | (2) |
| MRU bit | = 1 | — | (1) = 0 |
|  |  |  | (2) = 1 |
| ECAM + MRU | HIT | — | write |
| RTAG | MISS | — | — |
| RCAM | — | HIT | HIT |
| MESI BITS | read | — | — |

Cycle
1 ECAM read
2 RCAM read without ECAM update
3 RCAM read with ECAM update and MRU update The second example is Case 3 of Table I where there is a "hit" in the ECAM but a "miss" in both RTAG and RCAM.

| Offset Miss (Case 3 of Table I) - PRIOR ART | | | | | | |
|---|---|---|---|---|---|---|
| CYCLE | 1 | 2 | 3 | 4 | 5–6 | 7 |
| line # | (1) | (?) | (1) | (2) | (2) | (2) |
| MRU bit | =1 | — | =0 | =1 | — | =1 |
| ECAM + MRU | HIT | — | write | write | — | HIT |
| RTAG | MISS | — | — | — | — | — |
| RCAM | — | MISS | — | read | — | write |
| MESI BITS | read | — | — | read | — | write |

Cycle
1 ECAM read
2 RCAM read without ECAM update
3 reset old MRU, allocate new ECAM/RCAM
4 write new ECAM + MRU, read RCAM/MESI for copyback
5–6 ECAM copyback, if necessary
7 line refill The following pipeline table shows the operation of the same Case 3 of Table I under the present invention. Again, only one cycle is needed to reset the MRU bit of the wrong cache line and set the MRU bit of the current cache line.

| Offset Miss-INVENTION | | | | | |
|---|---|---|---|---|---|
| CYCLE | 1 | 2 | 3 | 4–5 | 6 |
| line # | (1) | (?) | (2) | (2) | (2) |
| MRU bit | = 1 | — | (1) = 0 | — | = 1 |
|  |  |  | (2) = 1 |  |  |
| ECAM + MRU | HIT | — | write | — | HIT |
| RTAG | MISS | — | read | — | write |
| RCAM | — | MISS | — | — | — |
| MESI BITS | read | — | read | — | write |

Cycle
1 ECAM read
2 RCAM read
3 write new ECAM + MRU, read RCAM/MESI for copyback, allocate PLRU
4–5 ECAM copyback, if necessary
6 line refill The third example is Case 2 of Table I. The ECAM/MRU update inhibits other operations from accessing the ECAM in cycle 2. Performance is improved by inserting a cycle because the other pipelines could then do their cycle 1 ECAM access during cycle 2. Then, the other pipeline does not need an ECAM search in its cycle 2, so the Case 2 operation can update the ECAM/MRU during its cycle 3.

| Aliased Hit (Case 2 of Table I)-PRIOR ART | | |
|---|---|---|
| CYCLE | 1 | 2 |
| LINE # | (1) | (2) |
| MRU bit | = 1 | = 1 |
| ECAM + MRU | MISS | WRITE |
| RTAG | — | — |
| RCAM | — | HIT |
| MESI BITS | — | — |

Cycle
1 ECAM read
2 RCAM read w/ECAM update

| Aliased Hit-INVENTION | | | |
|---|---|---|---|
| CYCLE | 1 | 2 | 3 |
| LINE # | (1) | (2) | (2) |
| MRU bit | = 1 | — | = 1 |
| ECAM + MRU | MISS | — | WRITE |
| RTAG | | | |
| RCAM | — | HIT | HIT |
| MESI BITS | — | — | — |

Figure 5:
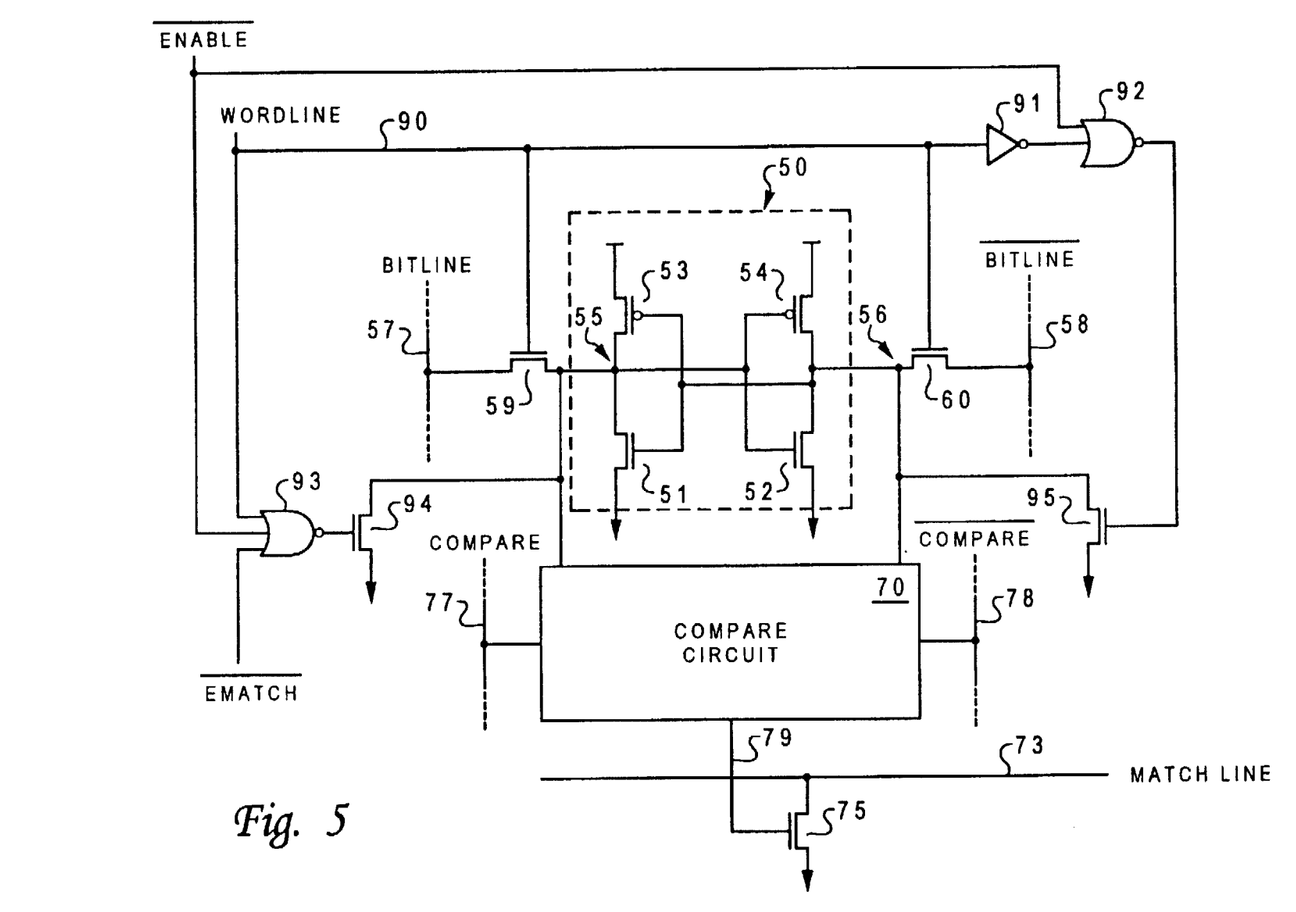
FIG. 5 is a schematic diagram of an MRU cell within an ECAM, according to a preferred embodiment of the invention.

Referring now to FIG. 5, there is depicted a schematic diagram of an MRU cell within an ECAM, according to a preferred embodiment of the invention. MRU cell 50 is a four-transistor SRAM memory cell having cross-coupled two n-channel driver transistors 51, 52 and two p-channel load transistors 53, 54. Data input/output nodes 55 and 56 of MRU cell 50 are connected to bitline 57 and $\overline{\text{bitline}}$ 58 via coupling transistors 59 and 60, respectively. A WORDLINE 90 is connected to each gate of coupling transistors 59 and 60.

MRU cell of FIG. 5 also contains a compare circuit 70 for comparison function. Inputs to compare circuit 70 are a pair of reference lines, compare 77 and $\overline{\text{compare}}$ 78. Both compare 77 and $\overline{\text{compare}}$ 78 represent a true-and-complement bit of a hard-wired bit input. This hard-wired bit input is preferably a "1" for the present invention. Output node 79 of compare circuit 70 is connected to a match line 73 via n-channel transistor 75.

According to a preferred embodiment of the invention, an invertor 91, a two-input NOR gate 92, a three-input NOR gate 93 and a pair of n-channel transistors 94, 95 are added to MRU cell 50. An $\overline{\text{ENABLE}}$ signal, an $\overline{\text{EMATCH}}$ signal, and WORDLINE signal 90 are input to NOR gate 93. The output of NOR gate 93 is utilized to turn on or turn off n-channel transistor 94. In the meantime, the $\overline{\text{ENABLE}}$ signal, and the $\overline{\text{WORDLINE}}$ signal are input to NOR gate 92. The output of NOR gate 92 is utilized to turned on or turn off n-channel transistor 95.

The set/reset circuit, as shown in FIG. 5, for setting/resetting MRU cell 50 is only an example and serves to demonstrate a preferred embodiment of the present invention. Any circuit that satisfies the truth table, as shown in Table II, would also serve the intended purpose of this invention.

TABLE II

| WORDLINE | $\overline{\text{ENABLE}}$ | $\overline{\text{EMATCH}}$ | MRU cell |
|---|---|---|---|
| − | − | + | as is |
| + | − | don't care | 1 |
| − | − | − | 0 |

As has been described, the present invention provides an improved mechanism for managing offset and aliasing conditions within a CAM-based cache memory. The improved mechanism can set the current MRU bit while concurrently resetting the non-current MRU bit within one clock cycle.

While the invention has been particularly shown and described with reference to a preferred embodiment, it will be understood by those skilled in the art that various changes in form and detail may be made therein without departing from the spirit and scope of the invention.

What is claimed is:

1. A cache memory having a mechanism for managing offset and aliasing conditions, said cache memory comprising:
   a first directory circuit for receiving partial effective addresses, wherein said first directory circuit includes a plurality of cache lines;
   a second directory circuit for receiving an output from said first directory circuit;
   a plurality of most recently used bits, wherein each of said plurality of most recently used bits is associated with a respective one of said plurality of cache lines ; and
   a set/reset circuit coupled to each of said plurality of most recently used bits, wherein said set/reset circuit includes a means for setting one of said plurality of most recently used bits to a first state while concurrently resetting the rest of said plurality of most recently used bits to a second state within a single clock cycle during an occurrence of an offset or aliasing condition, such that offset and aliasing conditions can be more efficiently managed.

2. The cache memory having a mechanism for managing offset and aliasing conditions according to claim 1, wherein said means for setting and resetting operates according to a truth table as follows:

| WORDLINE signal | $\overline{\text{ENABLE}}$ signal | $\overline{\text{EMATCH}}$ signal | MRU bit |
|---|---|---|---|
| 0 | 0 | 1 | as is |
| 1 | 0 | don't care | 1 |
| 0 | 0 | 0 | 0 | wherein said WORDLINE signal, said $\overline{\text{ENABLE}}$ signal, and said $\overline{\text{EMATCH}}$ signal are inputs, wherein said $\overline{\text{EMATCH}}$ signal indicates whether or not there is a match within said first directory circuit.

3. The cache memory having a mechanism for managing offset and aliasing conditions according to claim 1, wherein said first and second directory circuits are content-addressable memories.

4. The cache memory having a mechanism for managing offset and aliasing conditions according to claim 1, wherein said first state is a logical "1" and said second state is a logical "0."

5. The cache memory having a mechanism for managing offset and aliasing conditions according to claim 1, wherein each of said plurality of most recently used bits is a static memory cell.

6. A method for managing offset and aliasing conditions in a cache memory, wherein said cache memory includes a first directory circuit and a secondary directory circuit, wherein said first directory circuit includes a plurality of cache lines, said method comprising the steps of:
   associating a most recent used bit to each of said plurality of cache lines within said first directory circuit;
   setting one of said plurality of most recently used bits to a first state while concurrently resetting the rest of said plurality of most recently used bits to a second state within a single cycle during an occurrence of an offset or aliasing condition such that offset and aliasing conditions can be managed.

7. The method for managing offset an d aliasing conditions in a cache memory according to claim 6, wherein said step of setting and resetting operates according to a truth table as follows:

| WORDLINE signal | $\overline{\text{ENABLE}}$ signal | $\overline{\text{EMATCH}}$ signal | MRU bit |
|---|---|---|---|
| 0 | 0 | 1 | as is |
| 1 | 0 | don't care | 1 |
| 0 | 0 | 0 | 0 | wherein said WORDLINE signal, said $\overline{\text{ENABLE}}$ signal, and said $\overline{\text{EMATCH}}$ signal are inputs, wherein said $\overline{\text{EMATCH}}$ signal indicates whether or not there is a match within said first directory circuit.

8. A data processing system comprising:
   a processor;
   a main memory;
   a cache memory for temporarily storing blocks of information from said main memory, said cache memory includes:
   a first directory circuit for receiving partial effective addresses, wherein said first directory circuit includes a plurality of cache lines;
   a second directory circuit for receiving an output from said first directory circuit;
   a plurality of most recently used bits, wherein each of said plurality of most recently used bits is associated with a respective one of said plurality of cache lines; and
   a set/reset circuit coupled to each of said plurality of most recently used bits, wherein said set/reset circuit includes a means for setting one of said plurality of most recently used bits to a first state while concurrently resetting the rest of said plurality of most recently used bits to a second state within a single clock cycle during an occurrence of an offset or aliasing condition, such that offset and aliasing conditions can be more efficiently managed.

9. The data processing system according to claim 8, wherein said means for setting and resetting operates according to a truth table as follows:

| WORDLINE signal | $\overline{\text{ENABLE}}$ signal | $\overline{\text{EMATCH}}$ signal | MRU bit |
|---|---|---|---|
| 0 | 0 | 1 | as is |
| 1 | 0 | don't care | 1 |
| 0 | 0 | 0 | 0 | wherein said WORDLINE signal, said $\overline{\text{ENABLE}}$ signal, and said $\overline{\text{EMATCH}}$ signal are inputs, wherein said $\overline{\text{EMATCH}}$ signal indicates whether or not there is a match within said first directory circuit.

10. The data processing system according to claim 8, wherein said first and second directory circuits are content-addressable memories.

* * * * *